(12) United States Patent
Gilbert et al.

(10) Patent No.: US 10,232,987 B2
(45) Date of Patent: Mar. 19, 2019

(54) BEVERAGE CONTAINER CLOSURE

(71) Applicant: Pacific Market International, LLC, Seattle, WA (US)

(72) Inventors: Tyler Sean Gilbert, Bellevue, WA (US); Randy Sims, Franklin, TN (US)

(73) Assignee: PACIFIC MARKET INTERNATIONAL, LLC, Seattle, WA (US)

( * ) Notice: Subject to any disclaimer, the term of this patent is extended or adjusted under 35 U.S.C. 154(b) by 110 days.

(21) Appl. No.: 15/162,346

(22) Filed: May 23, 2016

(65) Prior Publication Data
US 2016/0264311 A1  Sep. 15, 2016

Related U.S. Application Data

(63) Continuation of application No. 15/080,137, filed on Mar. 24, 2016, now Pat. No. 10,023,366, which is a (Continued)

(51) Int. Cl.
*B65D 43/26* (2006.01)
*B65D 81/38* (2006.01)
(Continued)

(52) U.S. Cl.
CPC ......... *B65D 43/26* (2013.01); *A47G 19/2272* (2013.01); *A47J 41/0022* (2013.01);
(Continued)

(58) Field of Classification Search
CPC .. B65D 47/247; B65D 47/245; B65D 47/248; B65D 47/249
(Continued)

(56) References Cited

U.S. PATENT DOCUMENTS

| 118,860 A | 9/1871 | Kent |
| 404,192 A | 5/1889 | Haas |

(Continued)

FOREIGN PATENT DOCUMENTS

| CN | 2198839 Y | 5/1995 |
| CN | 2210160 Y | 10/1995 |

(Continued)

OTHER PUBLICATIONS

Extended European Search Report dated Oct. 18, 2012, European Patent Application No. 12173632.6, four pages.
(Continued)

*Primary Examiner* — Jeffrey R Allen
*Assistant Examiner* — Jennifer Castriotta
(74) *Attorney, Agent, or Firm* — Davis Wright Tremaine LLP; George C. Rondeau, Jr.

(57) ABSTRACT

A beverage container closure or lid that is adapted for closing an open end of a beverage container. The lid is selectively couplable to the beverage container and includes a selectively openable stopper that when closed, creates a fluid-tight seal between the beverage container and the environment. The stopper may be selectively opened by a user by the user pressing a button disposed on a side of the beverage container closure. The stopper is subsequently automatically closed when the user releases the button. Thus, a user may open and close the beverage container closure using a single hand without the need to remove the beverage container closure from the beverage container.

39 Claims, 12 Drawing Sheets

Related U.S. Application Data continuation of application No. 14/279,179, filed on May 15, 2014, now Pat. No. 9,375,107, which is a continuation of application No. 13/749,310, filed on Jan. 24, 2013, now Pat. No. 8,746,496, which is a continuation of application No. 12/946,501, filed on Nov. 15, 2010, now Pat. No. 8,360,258.

(51) Int. Cl.

| | | |
|---|---|---|
| *B65D 47/06* | (2006.01) | |
| *B65D 43/02* | (2006.01) | |
| *B65D 47/24* | (2006.01) | |
| *A47G 19/22* | (2006.01) | |
| *A47J 41/00* | (2006.01) | |
| *B65D 47/32* | (2006.01) | |
| *B65D 50/06* | (2006.01) | |
| *B65D 51/16* | (2006.01) | |
| *B65D 51/18* | (2006.01) | |
| *B65D 43/18* | (2006.01) | |
| *B65D 53/02* | (2006.01) | |

(52) U.S. Cl.
CPC ......... *B65D 43/02* (2013.01); *B65D 43/0225* (2013.01); *B65D 43/18* (2013.01); *B65D 43/265* (2013.01); *B65D 47/06* (2013.01); *B65D 47/245* (2013.01); *B65D 47/247* (2013.01); *B65D 47/248* (2013.01); *B65D 47/249* (2013.01); *B65D 47/32* (2013.01); *B65D 50/061* (2013.01); *B65D 51/1683* (2013.01); *B65D 51/18* (2013.01); *B65D 53/02* (2013.01); *B65D 81/3865* (2013.01); *B65D 2205/02* (2013.01); *B65D 2251/009* (2013.01); *B65D 2251/0018* (2013.01); *B65D 2251/0028* (2013.01); *B65D 2251/0081* (2013.01); *B65D 2251/0087* (2013.01); *B65D 2543/00046* (2013.01)

(58) Field of Classification Search
USPC ........... 220/715; 222/153.11, 153.14, 153.13
See application file for complete search history.

(56) References Cited

U.S. PATENT DOCUMENTS

| | | |
|---|---|---|
| 421,282 A | 2/1890 | Jackson |
| 599,389 A | 2/1898 | Jackson |
| 656,000 A | 8/1900 | Wall |
| 657,636 A | 9/1900 | Bingham |
| 768,355 A | 8/1904 | Bolen |
| 830,142 A | 9/1906 | Ebbing |
| 1,072,588 A | 9/1913 | Duncan |
| 1,284,728 A | 11/1918 | Wahl et al. |
| 2,138,387 A | 11/1938 | Officer |
| 2,193,232 A | 3/1940 | Hacmac |
| 2,210,206 A | 8/1940 | Fisher |
| 2,274,849 A | 3/1942 | Peterson |
| 2,447,870 A | 8/1948 | Polcyn |
| 2,622,420 A | 12/1952 | Rice |
| 2,799,437 A | 7/1957 | Jepson |
| 2,884,157 A | 4/1959 | Lampkin |
| 3,050,219 A | 8/1962 | Sagarin |
| 3,059,816 A | 10/1962 | Goldstein |
| 3,096,897 A | 7/1963 | Hansen |
| 3,185,350 A | 5/1965 | Abplanalp |
| 3,325,054 A | 6/1967 | Braun |
| D209,483 S | 12/1967 | Frank |
| 3,422,996 A | 1/1969 | Lipman |
| 3,591,128 A | 7/1971 | Ramis |
| 3,635,380 A | 1/1972 | Fitzgerald |
| 3,722,748 A | 3/1973 | Wakeman et al. |
| 3,739,938 A | 6/1973 | Paz |
| 3,744,682 A | 7/1973 | Blank |
| 3,770,167 A | 11/1973 | Ewald |
| 3,964,631 A | 6/1976 | Albert |
| 3,967,748 A | 7/1976 | Albert |
| 3,972,443 A | 8/1976 | Albert |
| 4,057,167 A | 11/1977 | Lee |
| 4,065,036 A | 12/1977 | Kirk, Jr. |
| 4,094,433 A | 6/1978 | Numbers |
| 4,099,642 A | 7/1978 | Hergard |
| 4,127,221 A | 11/1978 | Vere |
| 4,133,446 A | 1/1979 | Albert |
| 4,136,799 A | 1/1979 | Albert |
| 4,171,060 A | 10/1979 | Howard et al. |
| 4,212,408 A | 7/1980 | Valenzona |
| 4,276,992 A | 7/1981 | Susich |
| 4,303,173 A | 12/1981 | Nergard |
| D274,984 S | 8/1984 | Thornell |
| D288,667 S | 3/1987 | Miner |
| 4,676,411 A | 6/1987 | Simasaki |
| D291,537 S | 8/1987 | Crawford et al. |
| 4,711,372 A | 12/1987 | Gach |
| 4,712,704 A | 12/1987 | Ramsey et al. |
| 4,779,766 A | 10/1988 | Kinsley |
| 4,801,053 A | 1/1989 | Kaster |
| 4,834,270 A | 5/1989 | Messner |
| 4,852,770 A | 8/1989 | Sledge et al. |
| 4,865,228 A | 9/1989 | Landecker |
| 4,881,668 A | 11/1989 | Kitterman et al. |
| D315,872 S | 4/1991 | Bixler |
| D318,427 S | 7/1991 | Sherburne, Jr. |
| 5,082,134 A | 1/1992 | Ramsey |
| 5,118,014 A | 6/1992 | Hestehave et al. |
| 5,153,977 A | 10/1992 | Toida et al. |
| 5,163,196 A | 11/1992 | Graebe et al. |
| 5,169,016 A | 12/1992 | Hinz, Jr. |
| 5,186,353 A | 2/1993 | Ramsey |
| 5,199,597 A | 4/1993 | Gladish |
| 5,222,623 A | 6/1993 | Eger et al. |
| 5,244,113 A | 9/1993 | Stymiest |
| 5,249,703 A | 10/1993 | Karp |
| 5,252,278 A | 10/1993 | Spann et al. |
| 5,307,950 A | 5/1994 | Li |
| 5,412,821 A | 5/1995 | Wilkinson |
| 5,427,271 A | 6/1995 | Wang |
| 5,462,185 A | 10/1995 | Walker, III |
| 5,465,866 A | 11/1995 | Belcastro |
| 5,477,980 A | 12/1995 | Chaffin |
| 5,485,938 A | 1/1996 | Boersma |
| D367,611 S | 3/1996 | Wagner, III et al. |
| 5,495,966 A | 3/1996 | Won |
| D373,927 S | 9/1996 | Kramer et al. |
| D375,019 S | 10/1996 | Goto et al. |
| 5,570,797 A | 11/1996 | Yeh |
| 5,573,139 A | 11/1996 | Yeh |
| 5,580,504 A | 12/1996 | Spann et al. |
| 5,615,808 A | 4/1997 | Huang |
| 5,652,985 A | 8/1997 | Wilkinson et al. |
| 5,680,951 A | 10/1997 | Feltman, III et al. |
| D386,948 S | 12/1997 | Wissinger |
| 5,711,452 A | 1/1998 | Chaffin |
| D392,888 S | 3/1998 | Bakic |
| 5,753,289 A | 5/1998 | Ness |
| D394,778 S | 6/1998 | Arns et al. |
| D397,905 S | 9/1998 | Hsu |
| D404,613 S | 1/1999 | Hatsumoto et al. |
| D405,011 S | 2/1999 | DeCoster et al. |
| D406,006 S | 2/1999 | Hatsumoto et al. |
| D407,313 S | 3/1999 | Wadsworth et al. |
| D408,221 S | 4/1999 | Asberg |
| 5,918,854 A | 7/1999 | Barrash et al. |
| 5,944,235 A | 8/1999 | Won |
| D416,755 S | 11/1999 | Trombly |
| D417,360 S | 12/1999 | Bickert et al. |
| 6,003,711 A | 12/1999 | Bilewitz |
| 6,010,029 A | 1/2000 | Wang |
| 6,036,271 A | 3/2000 | Wilkinson et al. |
| 6,053,474 A | 4/2000 | Stucke, Jr. et al. |
| 6,098,834 A | 8/2000 | Hatsumoto et al. |
| 6,102,244 A | 8/2000 | Kuwano et al. |

(56) References Cited

U.S. PATENT DOCUMENTS

| | | |
|---|---|---|
| 6,116,476 A | 9/2000 | Huang |
| 6,126,035 A | 10/2000 | Schaper et al. |
| 6,158,608 A | 12/2000 | Schlattl |
| RE37,016 E | 1/2001 | Morano |
| D437,229 S | 2/2001 | Andrew |
| 6,276,560 B1 | 8/2001 | Belcastro |
| D447,693 S | 9/2001 | Warner et al. |
| 6,351,863 B1 | 3/2002 | Meyer et al. |
| 6,352,166 B1 | 3/2002 | Copeland |
| 6,401,990 B1 | 6/2002 | Walters et al. |
| D460,894 S | 7/2002 | Ziegenfus et al. |
| 6,443,325 B1 | 9/2002 | Schaper et al. |
| 6,471,085 B1 | 10/2002 | Gallo |
| D470,009 S | 2/2003 | Turchi et al. |
| D471,808 S | 3/2003 | de Castro Couto |
| 6,557,717 B1 | 5/2003 | Keck |
| D476,230 S | 6/2003 | Braaten et al. |
| 6,601,735 B2 | 8/2003 | Milian et al. |
| 6,626,314 B1 | 9/2003 | McHenry et al. |
| D480,268 S | 10/2003 | Laib |
| 6,644,490 B2 | 11/2003 | Clarke |
| 6,679,397 B2 | 1/2004 | Smith et al. |
| 6,695,171 B2 | 2/2004 | Walters et al. |
| 6,702,137 B1 | 3/2004 | Kowa et al. |
| D489,257 S | 5/2004 | Braaten et al. |
| 6,732,875 B2 | 5/2004 | Smith et al. |
| 6,732,876 B2 | 5/2004 | Belcastro |
| 6,763,964 B1 | 7/2004 | Hurlbut et al. |
| 6,824,003 B1 | 11/2004 | Wong |
| D500,428 S | 1/2005 | Ward et al. |
| 6,854,615 B2 | 2/2005 | von Ronn et al. |
| D502,844 S | 3/2005 | Rohe |
| D508,185 S | 8/2005 | Gauss |
| 6,935,536 B2 | 8/2005 | Tardif |
| 6,976,281 B2 | 12/2005 | Schunk et al. |
| 6,978,910 B2 | 12/2005 | Sanders et al. |
| D513,452 S | 1/2006 | Parve |
| 7,011,227 B2 | 3/2006 | Ward et al. |
| D522,794 S | 6/2006 | Imai |
| D523,340 S | 6/2006 | Westphal |
| 7,073,678 B1 | 7/2006 | Dibdin et al. |
| D526,898 S | 8/2006 | Isono et al. |
| D526,899 S | 8/2006 | Mangin et al. |
| D529,379 S | 10/2006 | Mengeu et al. |
| D529,761 S | 10/2006 | Trombly |
| D532,300 S | 11/2006 | Moretti |
| D533,064 S | 12/2006 | Glynn et al. |
| 7,195,137 B2 | 3/2007 | Belcastro |
| D540,625 S | 4/2007 | Sandberg |
| 7,201,288 B2 | 4/2007 | von Ronn et al. |
| D541,572 S | 5/2007 | Watanabe |
| D544,300 S | 6/2007 | Tien |
| D547,122 S | 7/2007 | Gluck |
| D547,611 S | 7/2007 | Seum et al. |
| D548,008 S | 8/2007 | Lin |
| D548,508 S | 8/2007 | Tonelli |
| D552,990 S | 10/2007 | Vogel |
| 7,275,653 B2 | 10/2007 | Tedford, Jr. |
| D554,433 S | 11/2007 | Gluck |
| D554,992 S | 11/2007 | Mangin et al. |
| D555,000 S | 11/2007 | Bunce et al. |
| D555,514 S | 11/2007 | Munn |
| D555,970 S | 11/2007 | Schreitmueller et al. |
| D558,111 S | 12/2007 | Banks, III |
| D560,435 S | 1/2008 | Meehan |
| D564,840 S | 3/2008 | Williams |
| D564,841 S | 3/2008 | Clemens et al. |
| D564,874 S | 3/2008 | Mangin et al. |
| D569,182 S | 5/2008 | Homma |
| D572,531 S | 7/2008 | Romandy et al. |
| D573,017 S | 7/2008 | Henderson |
| D573,404 S | 7/2008 | Wahl |
| 7,413,096 B2 | 8/2008 | Morgan et al. |
| D577,582 S | 9/2008 | Walsh et al. |
| D577,958 S | 10/2008 | Homma |
| D581,279 S | 11/2008 | Oates |
| D581,727 S | 12/2008 | Pinelli et al. |
| D584,107 S | 1/2009 | George |
| D585,698 S | 2/2009 | Trombly |
| D587,060 S | 2/2009 | Tong Chi Chung |
| D587,969 S | 3/2009 | Gilbert |
| D588,411 S | 3/2009 | Watanabe |
| D589,750 S | 4/2009 | Liu et al. |
| 7,513,380 B2 | 4/2009 | Canedo |
| D592,012 S | 5/2009 | Carreno |
| D592,456 S | 5/2009 | Pinelli et al. |
| D592,505 S | 5/2009 | Mobley et al. |
| D592,905 S | 5/2009 | Pinelli et al. |
| D592,913 S | 5/2009 | Pinelli et al. |
| 7,546,933 B2 | 6/2009 | Pinelli |
| D603,704 S | 11/2009 | Jost et al. |
| 7,611,029 B2 | 11/2009 | Wong |
| D606,364 S | 12/2009 | Gilbert et al. |
| D609,054 S | 2/2010 | Gilbert |
| D610,874 S | 3/2010 | Gilbert et al. |
| D611,764 S | 3/2010 | Wahl et al. |
| D613,160 S | 4/2010 | Ablo |
| D623,473 S | 9/2010 | Chen |
| D623,474 S | 9/2010 | Carlson et al. |
| D623,476 S | 9/2010 | Carlson et al. |
| D625,146 S | 10/2010 | George et al. |
| D629,653 S | 12/2010 | Gullickson et al. |
| D634,161 S | 3/2011 | Roth et al. |
| RE42,484 E | 6/2011 | Kitamura et al. |
| D640,094 S | 6/2011 | Carlson et al. |
| D643,245 S | 8/2011 | Minarsch |
| 7,997,442 B2 | 8/2011 | Pinelli |
| D648,985 S | 11/2011 | Chiu et al. |
| 8,056,745 B2 | 11/2011 | Yu |
| D656,787 S | 4/2012 | Phillips et al. |
| D658,443 S | 5/2012 | Chiu et al. |
| D659,473 S | 5/2012 | Ghiassi |
| D662,360 S | 6/2012 | George |
| 8,297,462 B1 | 10/2012 | Joyce |
| 8,360,258 B2 | 1/2013 | Gilbert et al. |
| 8,360,267 B1 | 1/2013 | Chiou et al. |
| D675,873 S | 2/2013 | Miller et al. |
| D676,278 S | 2/2013 | Wong |
| 8,376,162 B2 | 2/2013 | Yang |
| 8,403,173 B2 | 3/2013 | Wahl et al. |
| 8,418,992 B2 | 4/2013 | Meyer et al. |
| 8,459,510 B2 | 6/2013 | Richards et al. |
| 8,464,895 B2 | 6/2013 | Gilbert et al. |
| D686,074 S | 7/2013 | Brinckerhoff et al. |
| 8,573,431 B2 | 11/2013 | Shepard et al. |
| 8,622,229 B2 | 1/2014 | Lane |
| D700,807 S | 3/2014 | Kershaw et al. |
| 8,727,176 B2 | 5/2014 | El-Saden et al. |
| 8,844,762 B2 | 9/2014 | Chiou et al. |
| 8,863,979 B2 | 10/2014 | El-Saden et al. |
| D721,250 S | 1/2015 | Chen et al. |
| 8,978,923 B2 | 3/2015 | George |
| D732,892 S | 6/2015 | Keys et al. |
| 9,113,698 B2 | 8/2015 | Blain et al. |
| 9,808,101 B2 | 11/2017 | Chiou et al. |
| 2002/0033400 A1 | 3/2002 | Rohrer et al. |
| 2003/0071041 A1 | 4/2003 | Vogel |
| 2003/0102338 A1 | 6/2003 | Martin |
| 2004/0040962 A1 | 3/2004 | Bielecki et al. |
| 2004/0217139 A1 | 11/2004 | Roth et al. |
| 2005/0029265 A1 | 2/2005 | Morgan et al. |
| 2006/0043091 A1 | 3/2006 | Pinelli et al. |
| 2006/0081633 A1 | 4/2006 | Schmidtner et al. |
| 2006/0096983 A1 | 5/2006 | Patterson |
| 2006/0113327 A1 | 6/2006 | Walters et al. |
| 2006/0175331 A1 | 8/2006 | Lin et al. |
| 2006/0226160 A1 | 10/2006 | Elsaden et al. |
| 2007/0170184 A1 | 7/2007 | Canedo |
| 2007/0210093 A1 | 9/2007 | Pinelli |
| 2007/0241134 A1 | 10/2007 | Gurrisi et al. |
| 2008/0156817 A1 | 7/2008 | Roseblade et al. |
| 2008/0237233 A1 | 10/2008 | Choi et al. |
| 2008/0272134 A1 | 11/2008 | Rohe |

(56) References Cited

U.S. PATENT DOCUMENTS

| | | | |
|---|---|---|---|
| 2010/0206835 A1* | 8/2010 | Yu | A47J 41/0027 215/355 |
| 2011/0132908 A1 | 6/2011 | Meehan | |
| 2011/0309095 A1 | 12/2011 | Pinelli | |
| 2012/0285961 A1 | 11/2012 | Roth et al. | |
| 2013/0119060 A1 | 5/2013 | Chiou et al. | |
| 2013/0140309 A1 | 6/2013 | George | |
| 2014/0197170 A1 | 7/2014 | Carlile et al. | |

FOREIGN PATENT DOCUMENTS

| | | |
|---|---|---|
| CN | 1245766 A | 3/2000 |
| CN | 1299317 A | 6/2001 |
| CN | 1345682 A | 4/2002 |
| CN | 1432512 A | 7/2003 |
| CN | 1636835 A | 7/2005 |
| CN | 2866364 Y | 2/2007 |
| DE | 3402894 A1 | 8/1985 |
| DE | 20003371 U1 | 4/2000 |
| DE | 202011002273 U1 | 5/2011 |
| EP | 1182147 A2 | 2/2002 |
| JP | 55-027429 | 2/1980 |
| JP | 58-043329 | 3/1983 |
| JP | 62-131622 | 8/1987 |
| JP | 9150852 A | 6/1997 |
| JP | 11-001258 | 1/1999 |
| JP | 2005193944 A | 7/2005 |
| JP | 2005-278855 A | 10/2005 |
| JP | 2009-279332 | 3/2009 |
| JP | 3171259 | 10/2011 |
| KR | 2019980061202 | 11/1998 |
| WO | 0034143 A1 | 6/2000 |
| WO | 2000045684 A1 | 8/2000 |
| WO | 2005/115204 A1 | 12/2005 |
| WO | 2010085367 A1 | 7/2010 |

OTHER PUBLICATIONS

International Search Report and Written Opinion dated May 21, 2012, International Patent Application No. PCT/US2011/060042, 13 pages.

International Preliminary Report on Patentability for related International Application No. PCT/US2012/064801, dated May 20, 2014.

* cited by examiner

BEVERAGE CONTAINER CLOSURE

BACKGROUND OF THE INVENTION

Field of the Invention

The present invention is directed generally to lids for liquid storage vessels such as for beverage or food containers and more particularly to lids with movable components.

Description of the Related Art

Prior art lids are typically of one of three types. The first type is a solid unitary lid that does not include openings or apertures through which the contents of a liquid storage vessel may exit the vessel. To drink from the vessel, a user must remove the lid. The second type, which may also be of a unitary construction, includes one or more unobstructed apertures through which the liquid may exit the vessel. In the second type, the apertures are always open. If the vessel is inadvertently tipped or dropped, the contents of the vessel may spill. The third type of lid includes one or more apertures through which the liquid may exit the vessel and a means for selectively opening and closing the apertures. When using the third type of lid, the user may selectively open the apertures to remove the contents from the vessel and selectively close the apertures to maintain the contents inside the vessel. Further, by closing the apertures, the lid may help insulate the contents from the environment outside the vessel.

DETAILED DESCRIPTION OF THE INVENTION

Figure 1:
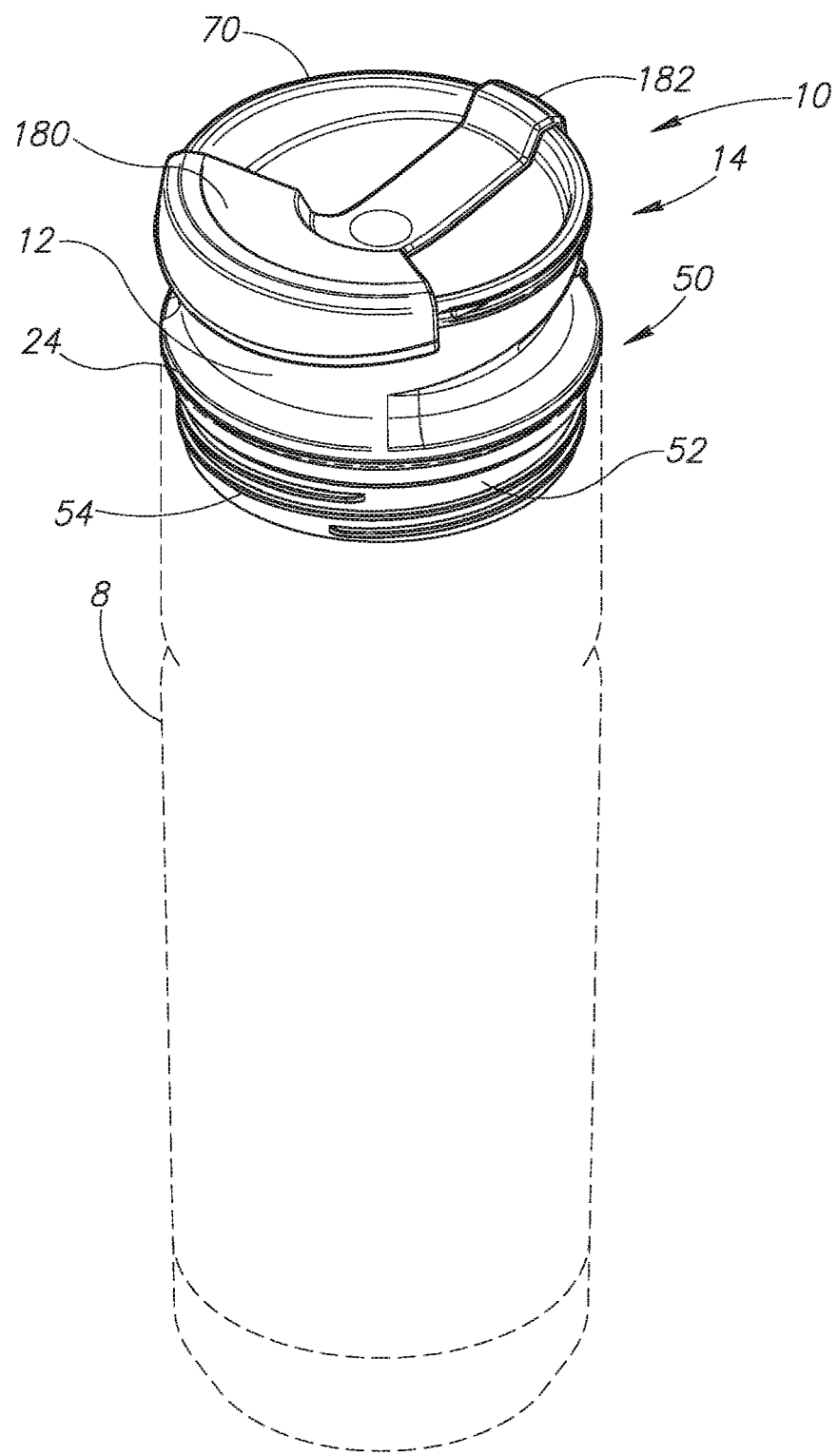
FIG. 1 is a top left side perspective view of a beverage container closure constructed in accordance with the present invention.
Figure 2:
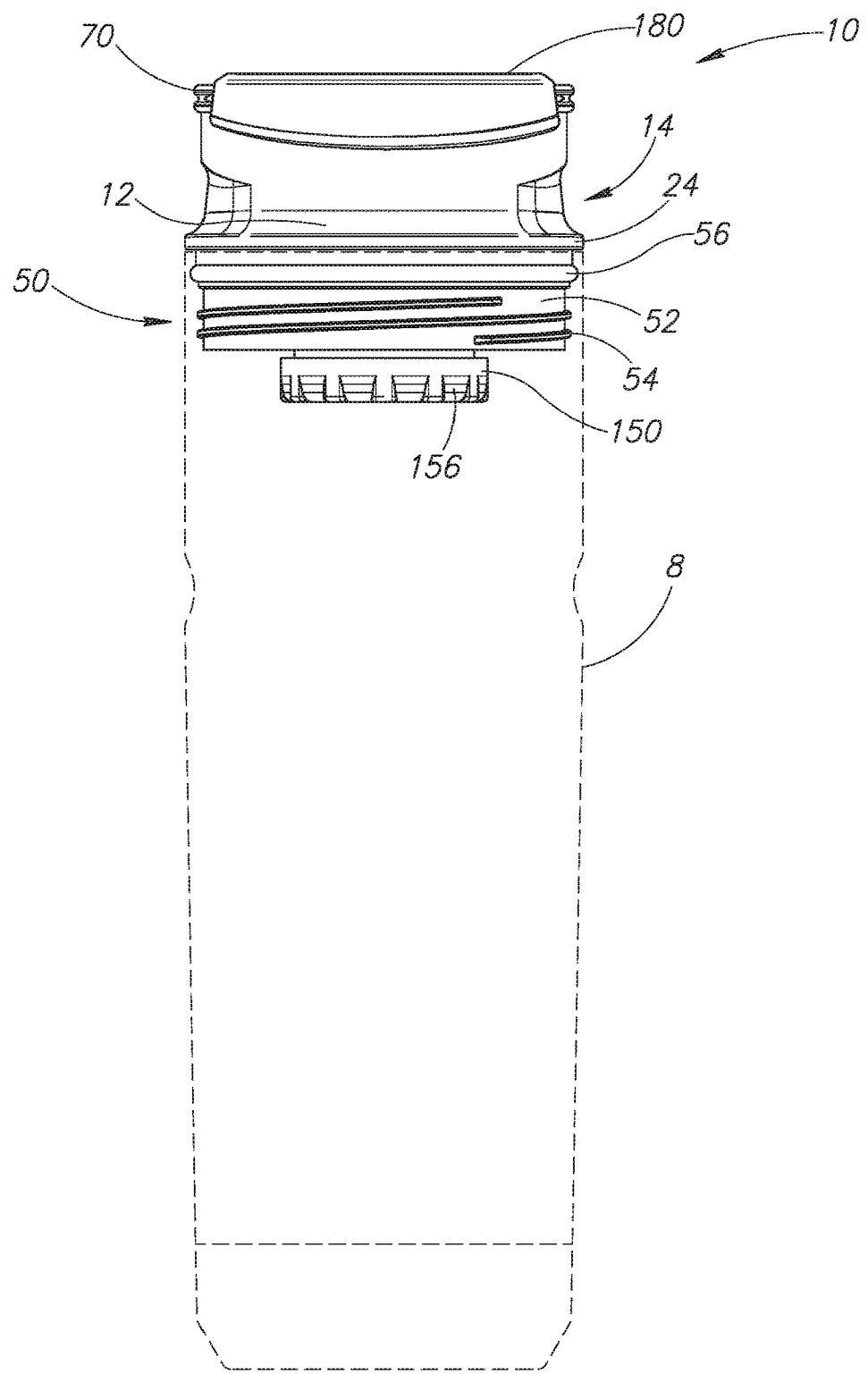
FIG. 2 is a front elevational view of the beverage container closure of FIG. 1.

A beverage container closure or lid, in accordance with an embodiment of the present invention, is generally indicated by reference numeral 10 in FIG. 1. The lid 10 has a generally cylindrical main body 12 that is adapted for closing an open end of a conventional drinking vessel or beverage container 8 (shown in dashed lines). The beverage container 8 may be any suitable type of container such as the tumbler type (that is, without a handle) for use in automotive beverage receptacles, or for transport in backpacks, book bags, and the like. The lid 10 is selectively couplable to the beverage container 8 by any suitable means such as threads 54 disposed on an outer surface of a sidewall 52 of a lower, downwardly depending portion 50 of the main body 12. The lid 10 also includes a flexible o-ring seal member 56 (see FIG. 2) positioned adjacent the sidewall 52 of the lower portion 50 at a location near a bottom surface of an upper portion 14 of the main body 12. The particular configuration for mating the lid 10 to the container 8 is a matter of choice for one of ordinary skill in the art. Thus, although threads 54 and the seal member 56 have been shown in this embodiment, those of ordinary skill in the art will appreciate that any other means for attaching and sealing the lid 10 with respect to the beverage container 8 may be substituted.

Figure 8:
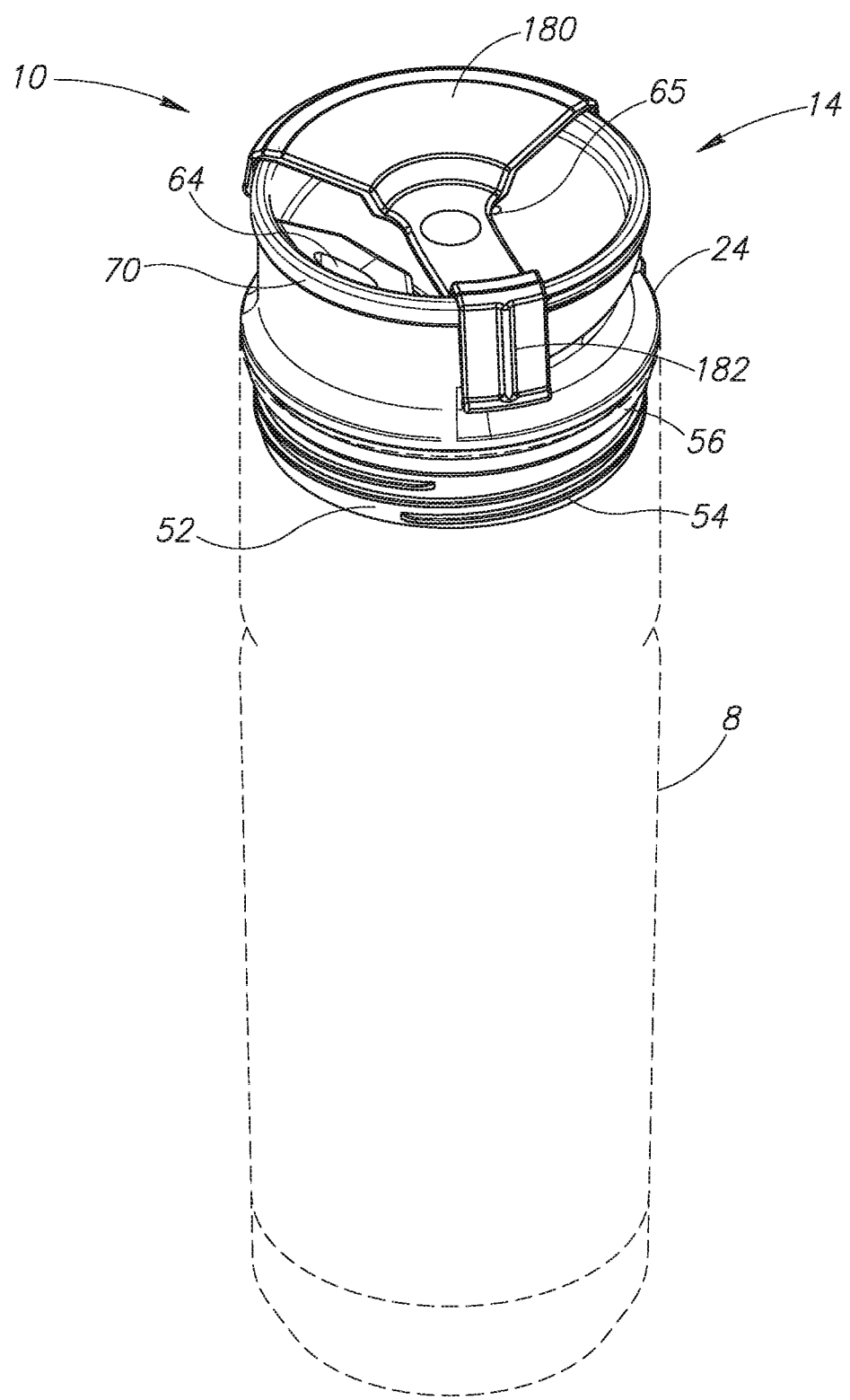
FIG. 8 is a top left side perspective view of the beverage container closure of FIG. 1, with a dust cover rotated away from the opening in the beverage container closure to provide a user with access to the opening.
Figure 11A:
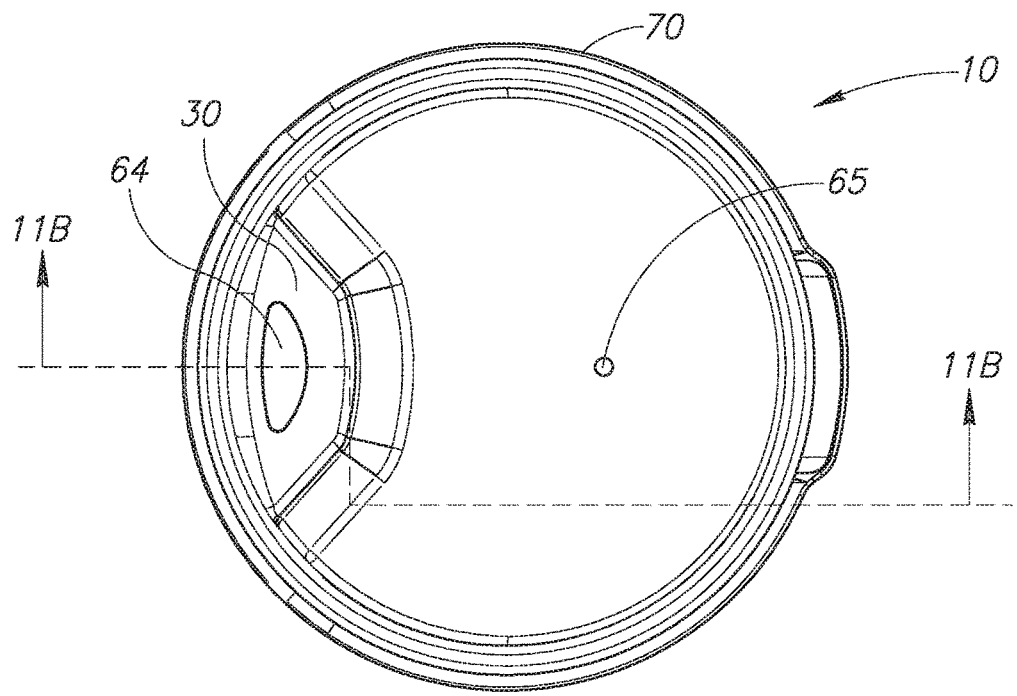
FIG. 11A is a top plan view of the beverage container closure of FIG. 1 with the dust cover removed.

As best seen in FIG. 8, the upper portion 14 of the main body 12 also includes a top rim portion 70 configured for contact with a user's lips when the entire assembly is tipped toward the user, such that the user may drink from the beverage container 8 to which the lid 10 is attached. The upper portion 14 also includes an aperture or opening 64 configured to permit fluid passage therethrough when a user drinks a beverage. The upper portion further includes an air vent 65 (see FIG. 11A) that allows liquid to flow more freely out of the beverage container 8 when a user drinks therefrom.

Figure 7:
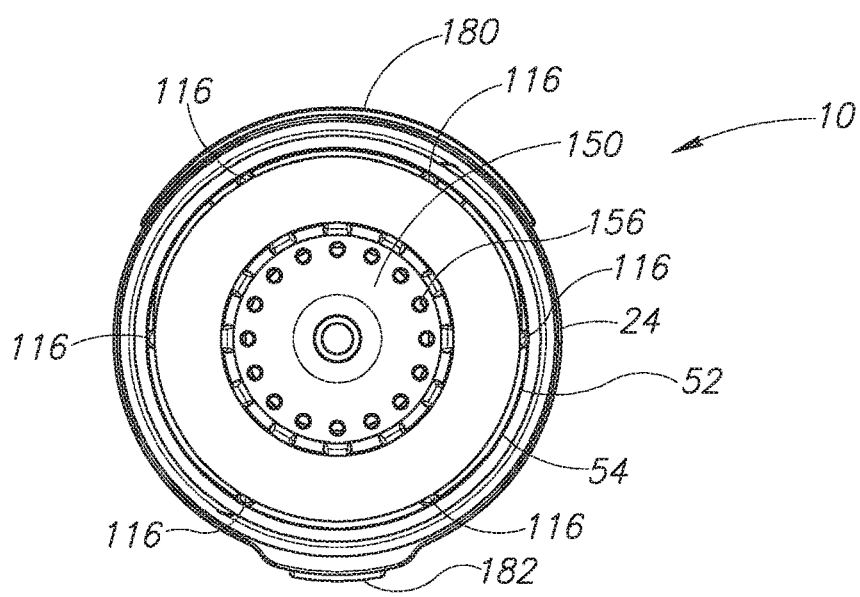
FIG. 7 is a bottom plan view of the beverage container closure of FIG. 1.
Figure 10:
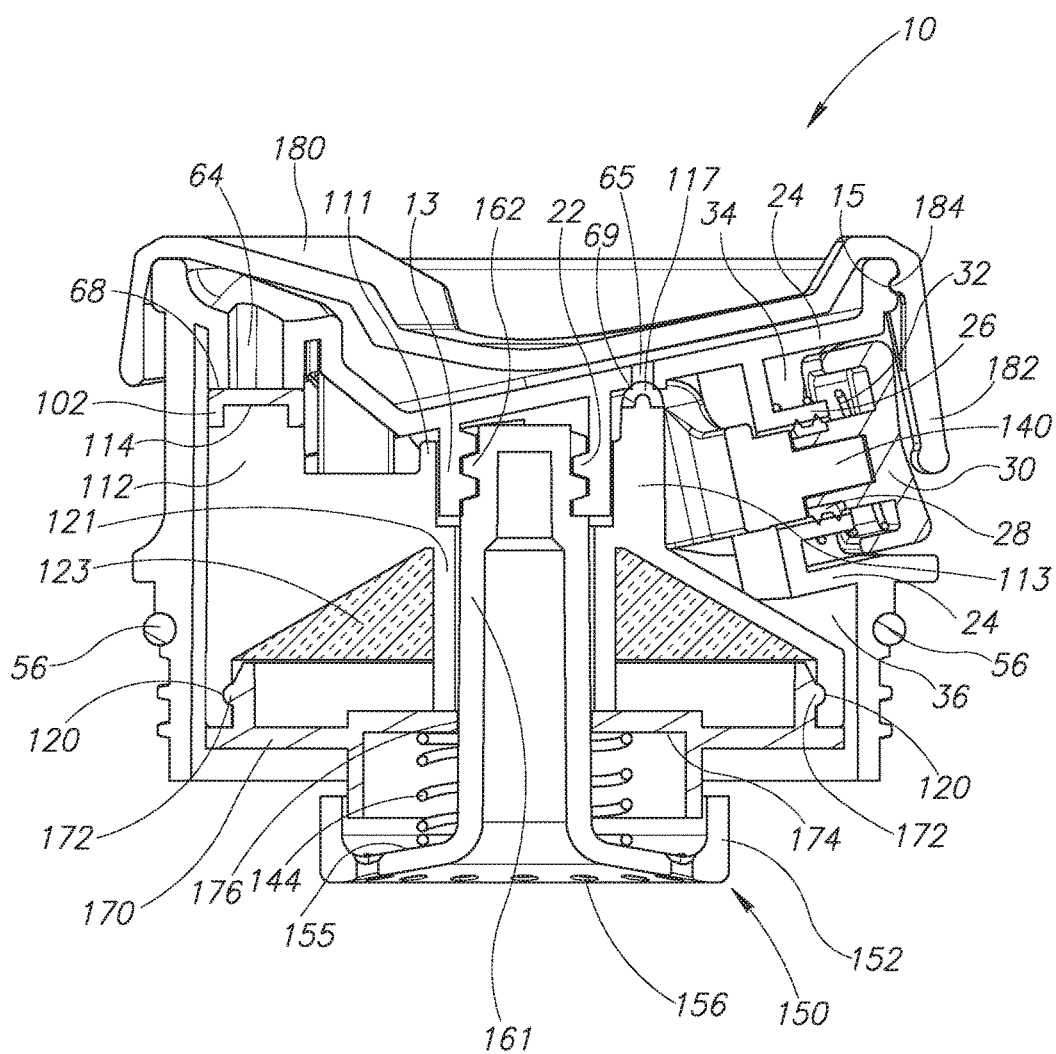
FIG. 10 is a cross-sectional left side elevational view of the beverage container closure of FIG. 1 with a stopper of the beverage container closure in the closed position.
Figure 11B:
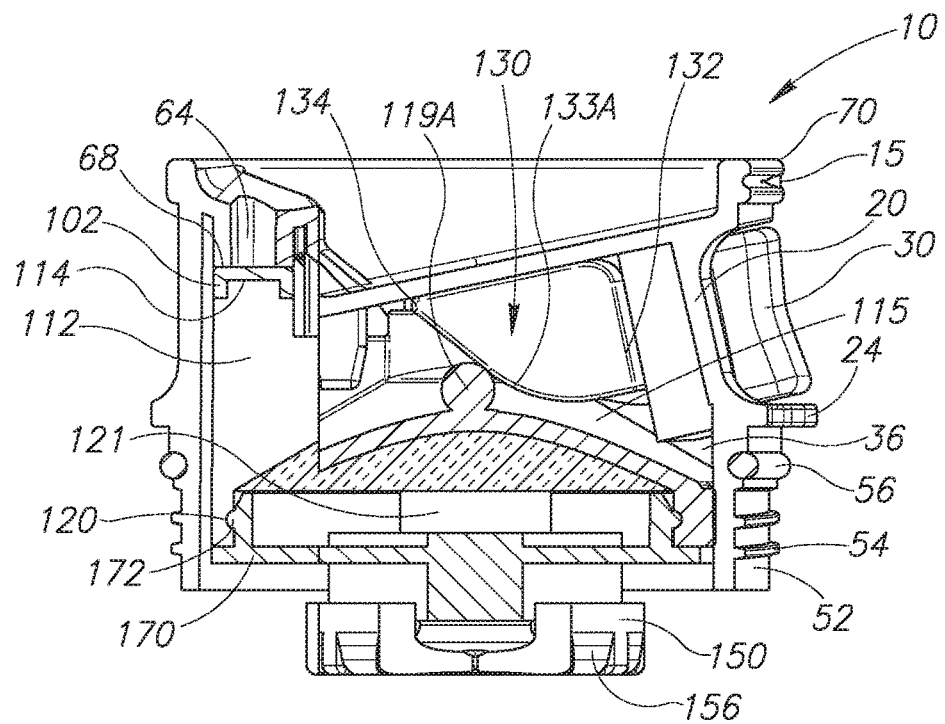
FIG. 11B is a sectional view taken substantially along the line 11B-11B of FIG. 11A with the stopper in the closed position.
Figure 12A:
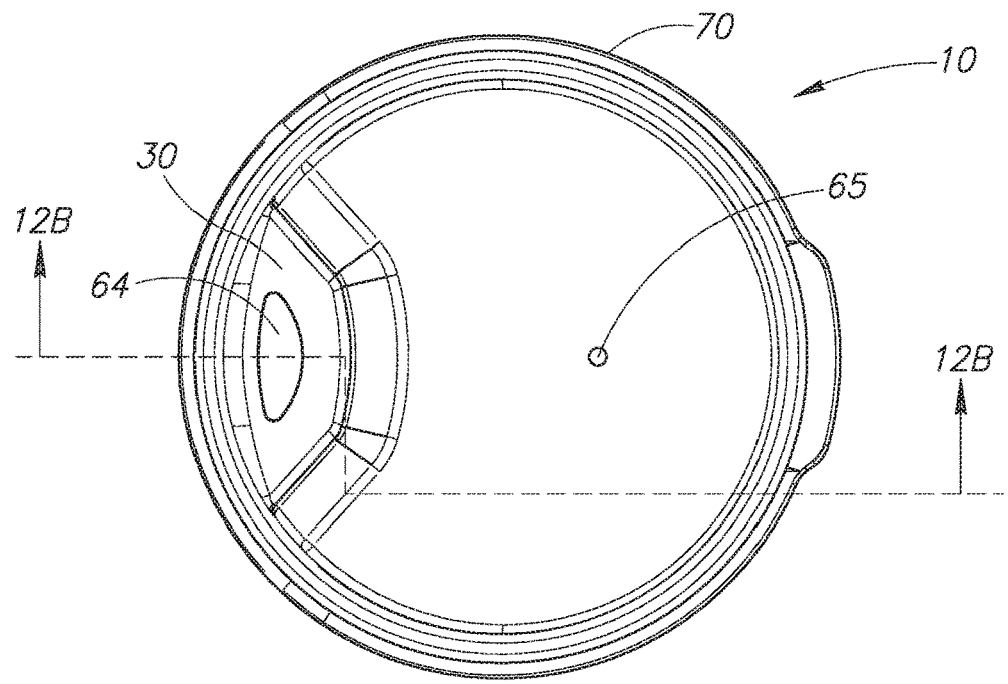
FIG. 12A is a top plan view of the beverage container closure of FIG. 1 with the dust cover removed.
Figure 12B:
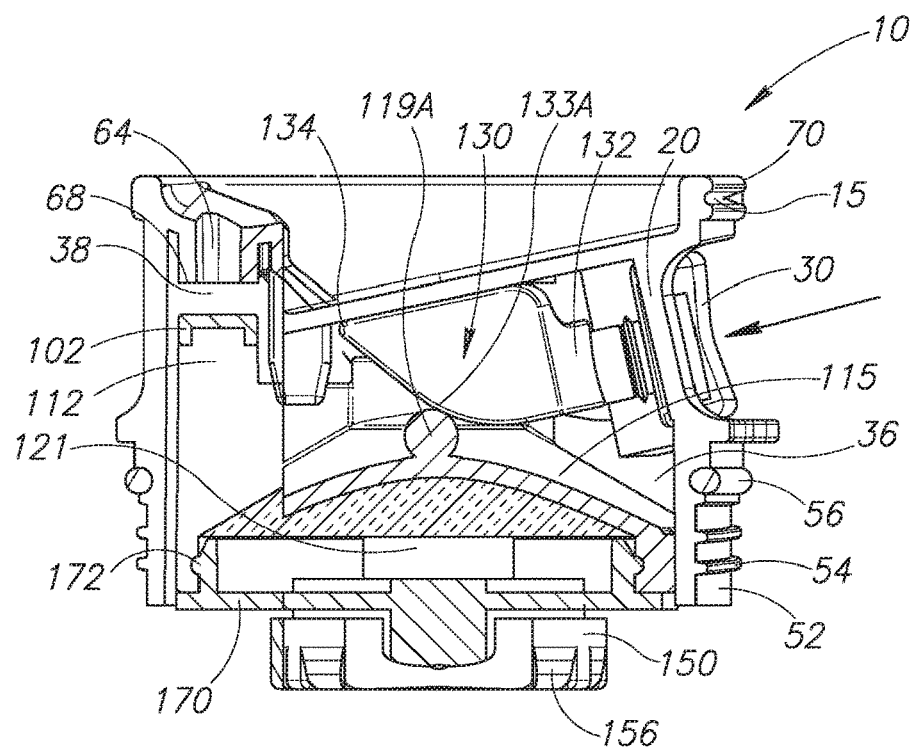
FIG. 12B is a sectional view taken substantially along the line 12B-12B of FIG. 12A with the stopper in the opened position.
Figure 13:
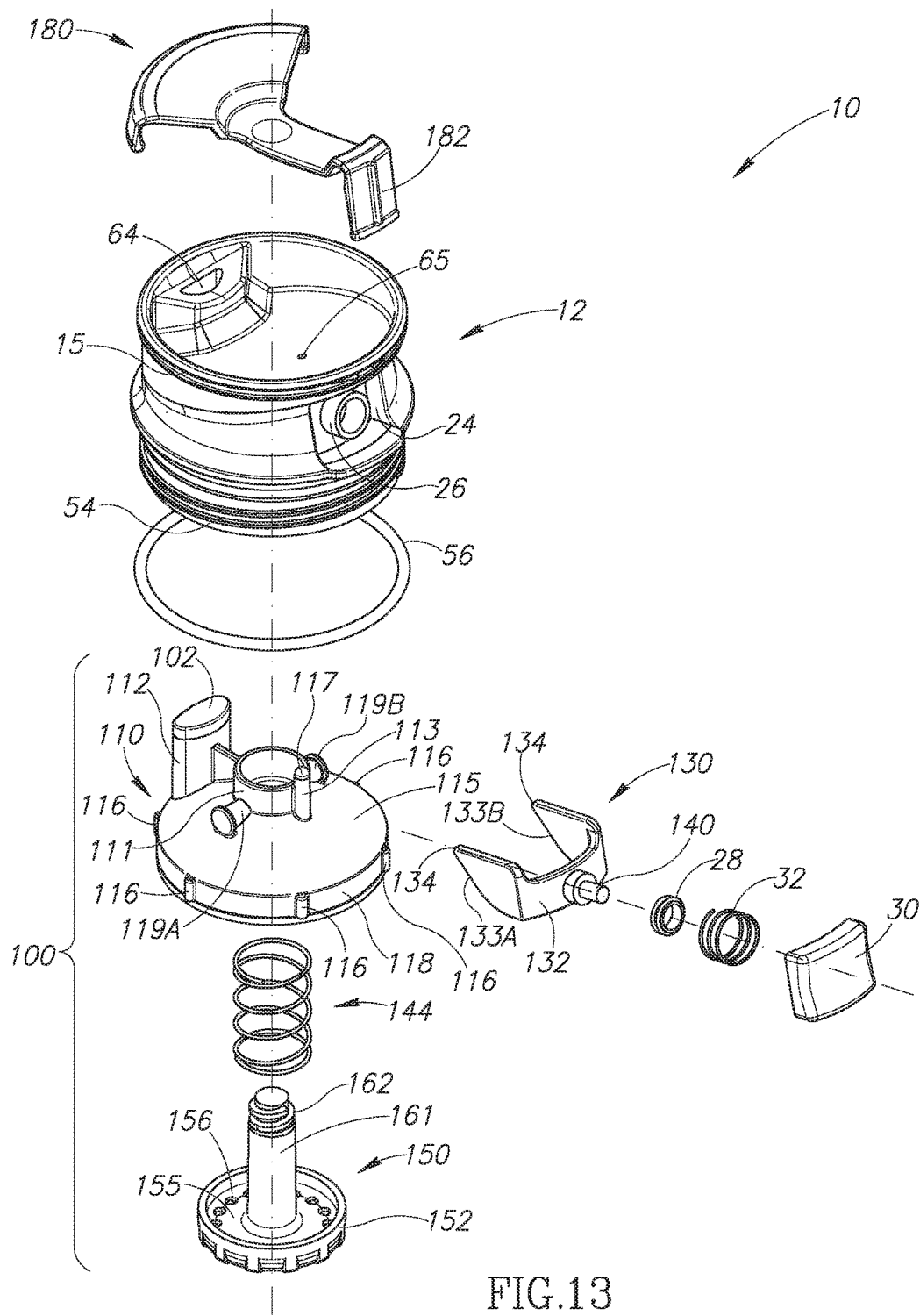
FIG. 13 is an exploded perspective view of a stopper assembly of the beverage container closure of FIG. 1.

Fluid communication between the upper portion 14 and the interior of the beverage container 8 is controlled by way of a selectively openable stopper assembly 100, which may best be viewed in FIG. 13. The stopper assembly 100 includes a stopper 110 having a first raised portion 112 configured for attachment of a stopper seal 102 thereto (e.g., by a press fit). The stopper seal 102 may be formed from a flexible material and is shaped to be positioned over a top surface 114 (see FIG. 10) of the first raised portion 112. The stopper 110 also includes a second raised portion 113 configured for attachment of a vent seal 117 thereto (e.g., by a press fit). Below the raised portions 112 and 113 of the stopper 110 is an angled base or body portion 115. Further, extending in a downward direction from the body portion 115 of the stopper 110 is a circumferential sidewall 118 that includes a circumferential groove 120 (see FIG. 10) disposed on its inner surface. As discussed in further detail below, the sidewall 118 and the groove 120 are configured to engage a ridge 172 of a stopper cap 170 via a press fit. The body portion 115 and stopper cap 170 of the stopper 110 form a fluid flow barrier portion of the stopper spanning across the hollow interior body region 36 of the main body 12 of the lid 10 with an outer edge of the barrier portion located immediately adjacent to the main body sidewall 52. As best seen in FIGS. 10, 11B and 12B, the barrier portion outer edge is spaced inward of the main body sidewall 52 to form a perimeter fluid flow pathway located outward of the barrier portion outer edge and adjacent to the main body sidewall during the entire travel of the stopper between the opened position and the closed position. As described below, a stopper sidewall 118 extends downwardly from the body portion 115 of the stopper 110 and forms a downwardly extending perimeter sidewall along the outer perimeter of the barrier portion. As best seen in FIGS. 7 and 13, a plurality of vertically extending and laterally projecting spacer portions 116 are located on the stopper sidewall 118 which forms the perimeter of the barrier portion and spaces the perimeter apart from the main body sidewall 52.

The stopper 110 also comprises an upwardly extending cylindrical wall 111 (see FIGS. 10 and 13) sized to be slightly larger than a downwardly extending cylindrical wall 13 of the upper portion 14 of the main body 12, such that the walls 13 and 111 may move axially freely in telescoping fashion with respect to each other when the lid 10 is operated by a user as described below. The stopper 110 also includes a pair of spaced apart cam follower surfaces 119A and 119B (or "cam followers") disposed on the base portion 115 of the stopper on opposing sides of the upwardly extending cylindrical wall 111. The functionality of the cam followers 119A and 119B are described herein below.

As may best be viewed in FIG. 10, the stopper cap 170 includes a circumferential ridge 172 for engagement (e.g., a snap fit) with the groove 120 of the stopper 110. The stopper cap 170 further includes an opening defined by an annular-shaped edge 176, and a bottom surface 174. These features are described below. When the stopper cap 170 is coupled to the stopper 110, an interior hollow region 123 is formed. To provide insulation between the interior of the beverage container 8 and the environment, an insulating substance, such as a ring of styrene, may be placed within the interior hollow region 123 of the stopper 110.

The stopper assembly 100 also includes a stopper cover 150 (see FIG. 10) configured for retaining the stopper assembly within a hollow interior region 36 of the main body 12. The stopper cover 150 includes a base portion 152 including a plurality of spaced apart apertures or openings 156 disposed therein to allow for fluid passage therethrough. Further, the stopper cover 150 comprises an upwardly extending substantially cylindrically-shaped rod 161 terminating with an engagement portion 162 with external threads. As shown, the rod 161 passes through the opening defined by the annular-shaped edge 176 in the stopper cap 170, and through a downwardly extending cylindrical wall 121 of the stopper 110, where it is threadably engaged with a stopper cover engagement portion 22 (with internal threads) of the downwardly extending cylindrical wall 13 of the upper portion 14 of the main body 12, thereby securing the stopper cover 150 (and the other components of the stopper assembly 100) to the main body 12 of the lid 10.

As may best be viewed in FIG. 10, the stopper assembly 100 further includes a stopper biasing member (in the illustrated embodiment, a spring) 144 configured for biasing the stopper 110 into the closed position which provides a fluid-tight seal for the lid 10. The stopper biasing member 144 is sized to have a diameter that is slightly larger than the upwardly extending substantially cylindrically-shaped rod 161 of the stopper cover 150, such that the stopper biasing member may be positioned over the rod 161 and between a top surface 155 of the base portion 152 of the stopper cover 150 and an inner bottom surface 174 of the stopper cap 170 (see FIG. 10).

As may best be viewed in FIGS. 11B, 12B, and 13, the stopper assembly 100 further includes an actuating member 130 configured for acting on the cam followers 119A and 119B of the stopper 110 to selectively move the stopper between the opened position and the closed position. The actuating member 130 includes first and second cam surfaces 133A and 133B (or "stopper engagement portions") spaced apart from each other and configured for slidable engagement with the first and second cam followers 119A and 119B (or "actuating member engagement portions"), respectively, of the stopper 110. The cam surfaces 133A and 133B are each ramp-shaped and are angled downward from a distal end 134 toward a proximal end 132 of the actuating member 130 (see FIGS. 11B and 12B). As described below, the cam surfaces 133A and 133B engage the cam follower surfaces 119A and 119B, respectively, to move the stopper 110 between the closed and opened positions (shown in FIGS. 11B and 12B, respectively). The actuating member 130 further includes a rod 140 (see FIG. 13) disposed at the proximal end 132 sized and shaped to be inserted (e.g., press fit) into a recessed portion of a button 30 (see FIGS. 10 and 13) configured to permit a user to actuate the actuating member 130 by simply pressing the button inward.

The operation of the stopper assembly 100 is now described with reference to FIGS. 11B and 12B, which show cut-away left side elevational views of the lid 10 when the stopper 110 is in the sealed or closed position (FIG. 11B) and the opened position (FIG. 12B). As can be seen, the stopper assembly 100 is positioned within the hollow interior region 36 of the main body 12. The engagement portion 162 of the stopper cover 150 is engaged with the stopper cover engagement portion 22 of the downwardly extending cylindrical wall 13 of the upper portion 14 disposed in the hollow interior region 36 of the main body 12. For example, the stopper cover 150 may be threadably engaged with the main body 12 to retain the stopper cover and the other components of the stopper assembly 100.

As shown in FIG. 11B, the stopper seal 102 is in contact with the stopper seal engagement portion 68 that defines the opening 64 of the main body 12. In this regard, when the stopper 100 is in the closed position shown in FIG. 11B, the stopper seal 102 and the vent seal 117 (see FIG. 10) are pressed against the stopper seal engagement portion 68 and a vent seal engagement portion 69, respectively, of the main body 12 by the biasing member 144 to provide a fluid-tight seal between the container 8 to which the lid 10 is attached and the environment.

The actuating member 130 is situated such that the first and second cam surfaces 133A and 133B are aligned over and in contact with the first and second cam followers 119A and 119B, respectively, of the stopper 110. The proximal end 132 of the actuating member 130 is situated within an opening in a rear portion 20 (see FIGS. 10 and 13) of the main body 12 formed by a circumferential wall 26. In turn, the button 30 is coupled to the actuating member 130 (e.g., by a press fit) to allow a user to actuate the actuating member by pressing inward on the button. A button biasing member (e.g., a spring) 32 is positioned over the circumferential wall 26 in a space 34 between the wall 26 and a surrounding outer wall 24 forming a recess in the rear portion 20 of the main body 12. The button biasing member 32 is operative to bias the button 30 and the actuating member 130 coupled thereto to the outward position shown in FIG. 11B which corresponds to the closed position of the stopper 110 and tends to bias the actuating member 130 toward that position. Further, a button ring seal member 28 (see FIGS. 10 and 13) may be disposed around a forward stem portion of the button 30 and inward of the circumferential wall 26 to provide a fluid-tight seal therebetween to prevent leakage to the environment.

In operation, a user may depress the button 30 which in turn causes the actuating member 130 to be displaced in an inward, substantially horizontal direction (from the right to the left in the views shown in FIGS. 11B and 12B). As the actuating member 130 is displaced, the first and second cam surfaces 133A and 133B of the actuating member 130 slidably engage the first and second cam follower surfaces 119A and 119B, respectively, of the stopper 110. Since the first and second cam surfaces 133A and 133B each slope downward from the distal end 134 toward the proximal end 132 of the actuating member 130, the first and second cam follower surfaces 119A and 119B (and thus the stopper 110) are moved in a downward direction as the actuating member 130 is displaced inward, as shown in FIG. 12B. As can be appreciated, as the stopper 110 is moved in a downward direction, a gap 38 (see FIG. 12B) is formed between the stopper seal 102 and the stopper seal engagement portion 68 of the main body 12 such that fluid may pass through the opening 64. Further, a gap is also formed simultaneously between the vent seal 65 and the vent seal engagement portion 69 of the main body 12 allowing air to pass through the vent opening 65 such that fluid may pass through the opening 64 more freely. It should be appreciated that although in this embodiment the actuating member 130 includes the cam surfaces 133A and 133B and the stopper 110 includes the cam followers 119A and 119B, in other embodiments the actuating member 130 may include one or more cam followers and the stopper 110 may include one or more corresponding cam surfaces.

Figure 3:
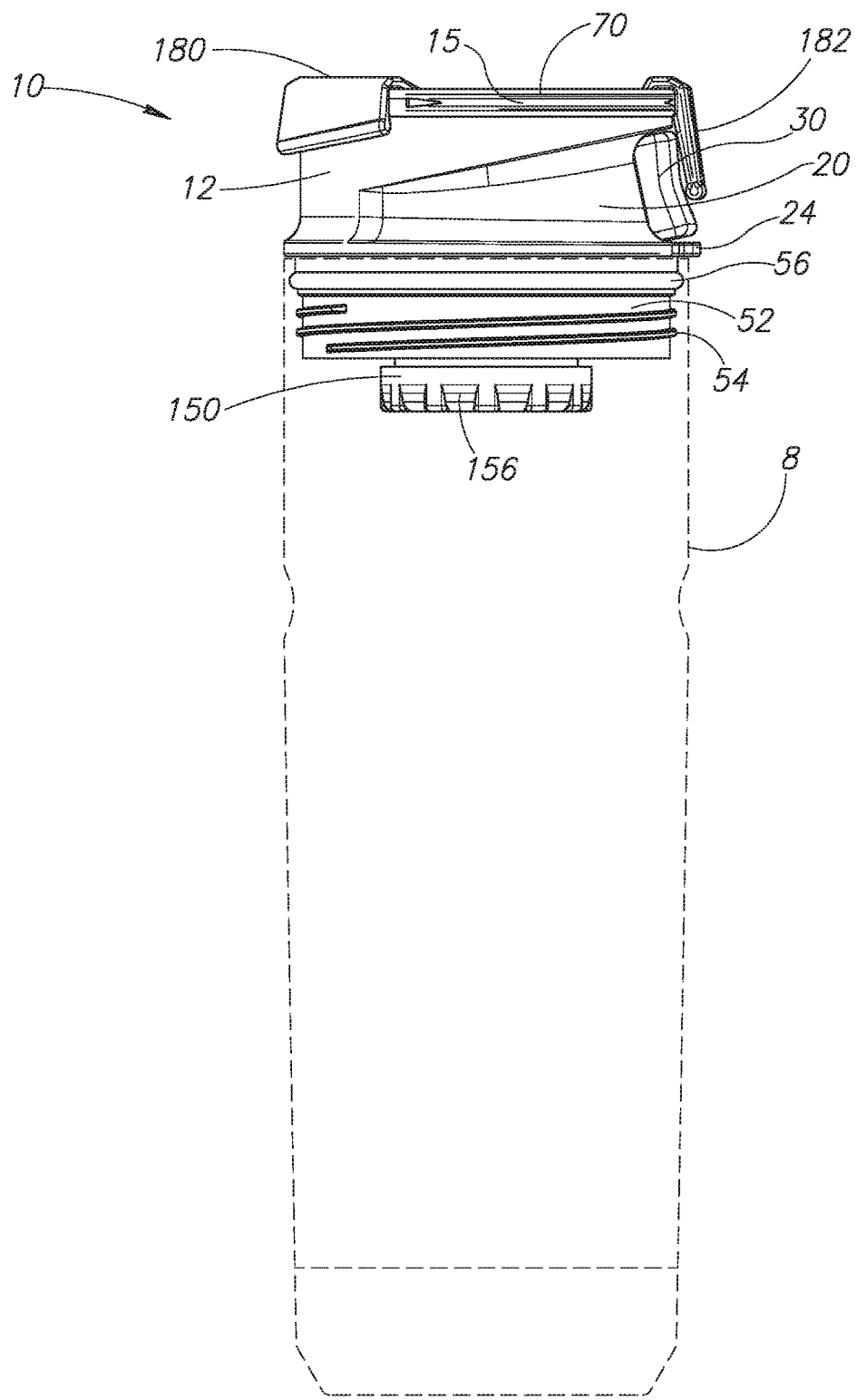
FIG. 3 is a left side elevational view of the beverage container closure of FIG. 1.
Figure 4:
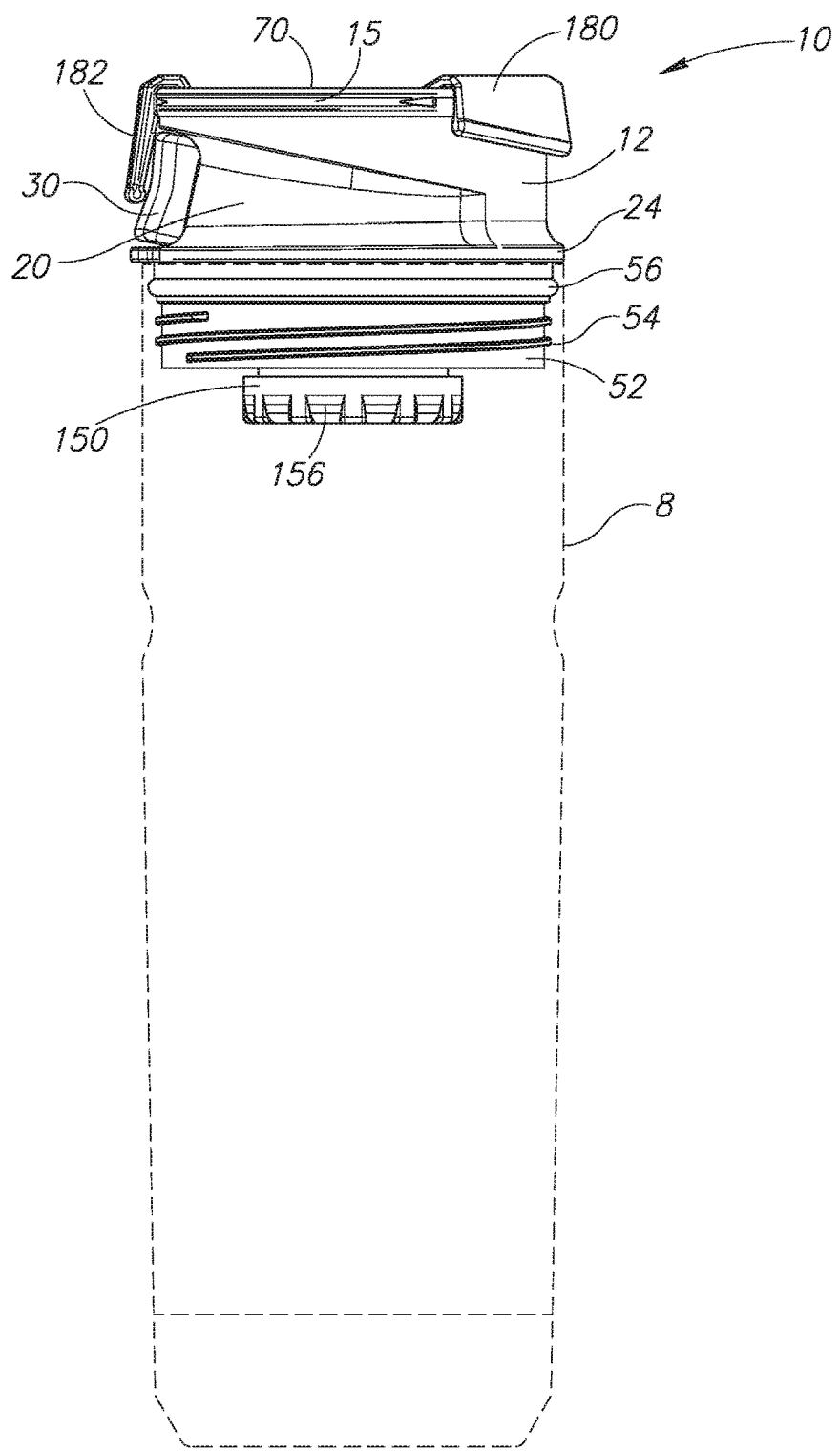
FIG. 4 is a right side elevational view of the beverage container closure of FIG. 1.
Figure 5:
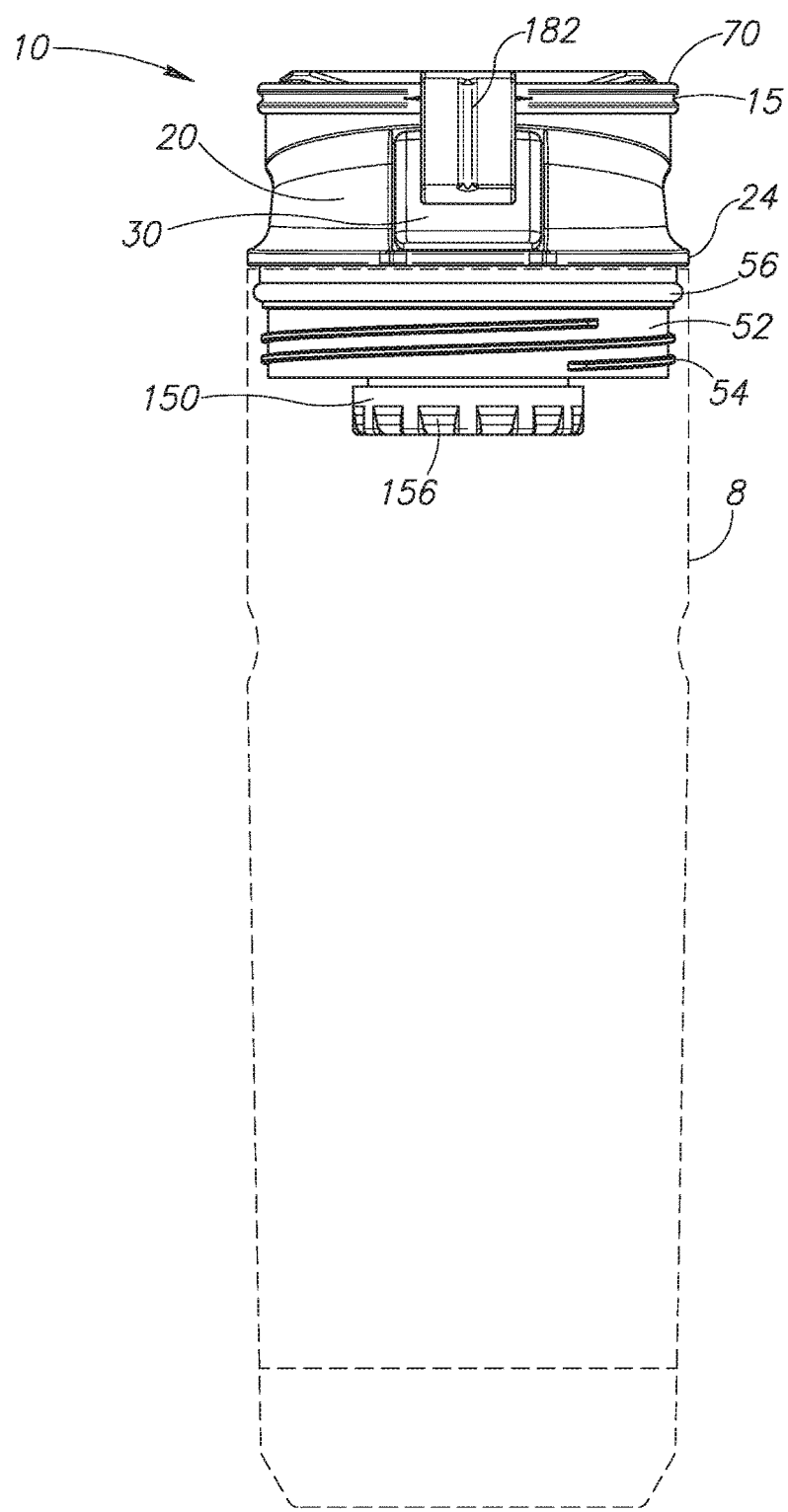
FIG. 5 is a rear elevational view of the beverage container closure of FIG. 1.
Figure 6:
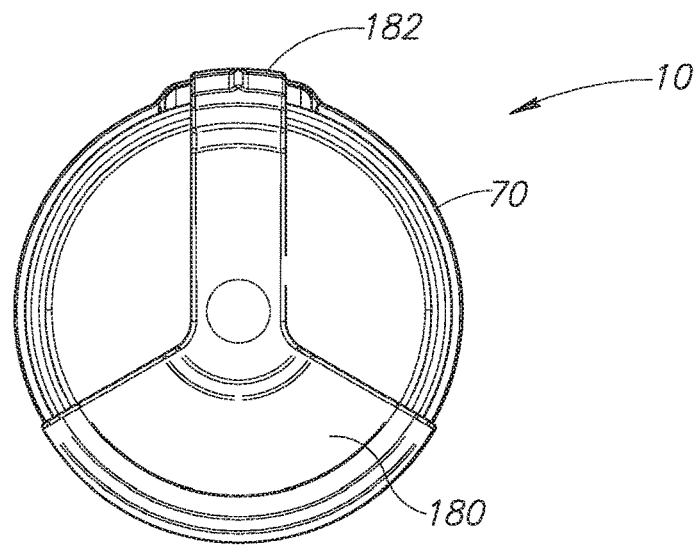
FIG. 6 is a top plan view of the beverage container closure of FIG. 1.
Figure 9:
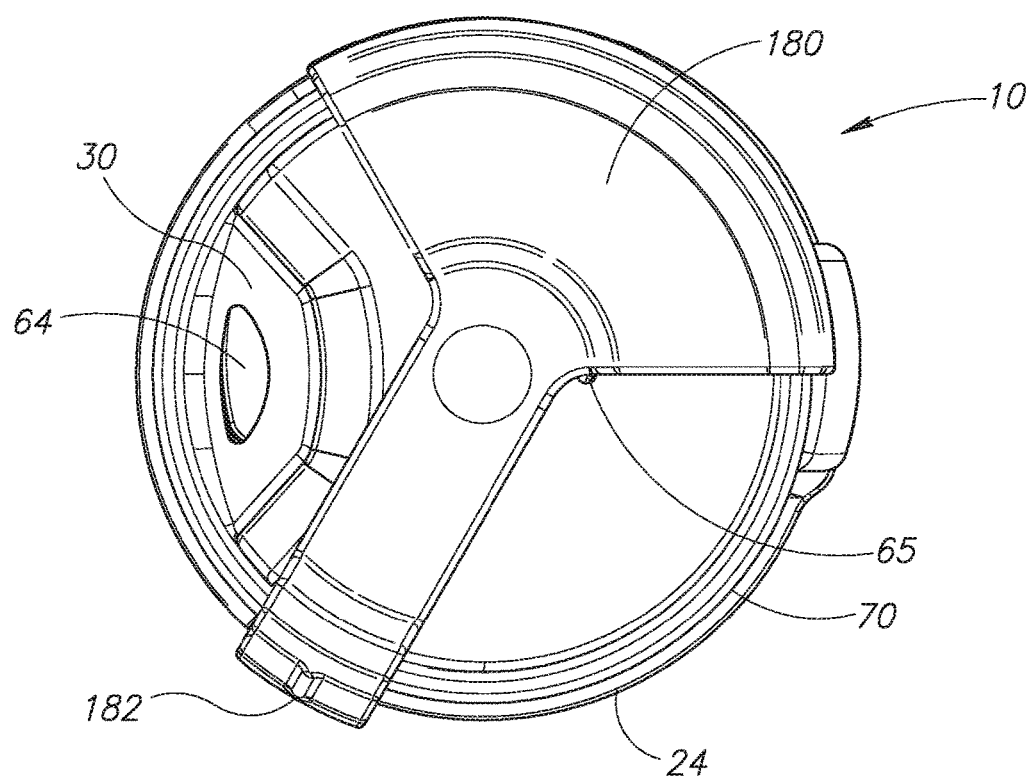
FIG. 9 is a top plan view of the beverage container closure of FIG. 8, with the dust cover rotated away from the opening in the beverage container.

The lid 10 also comprises a selectively rotatable, exterior dust cover 180 engaged with the upper portion 14 of the main body 12 that is operative to cover the openings 64 and 65 when a user is not using the lid (see FIG. 1). The dust cover 180 comprises a downwardly extending button covering portion 182 (or "actuating member covering portion"). The button covering portion 182 extends over the button 30 to prohibit accidental activation of the button 30 (and thus the actuating member 130) when the lid is not in use and the dust cover is rotated into position to cover the openings 64 and 65 (see FIG. 5), during which time the stopper 110 would be in the closed position shown in FIG. 11B. The button covering portion 182 also includes a horizontal thin strip or tongue 184 (see FIG. 10) sized to slidably fit within a horizontal corresponding groove 15 (see FIGS. 3 and 10) disposed on the perimeter of an outer surface of the upper portion 14 of the main body 12. Thus, a user may selectively rotate the dust cover 180 from a first position wherein the dust cover covers the openings 64 and 65 and a portion of the button 30 (see FIGS. 1 and 5), to a second position shown in FIGS. 8 and 9 wherein the dust cover does not cover the openings and the button so that the user may operate the lid 10 as described above to drink a fluid housed in the container 8 to which the lid is attached.

As can be appreciated, the assembly described above may be disassembled by a user for cleaning if desired. As may best be viewed in FIGS. 10 and 13, a user may simply unscrew the stopper cover 150 from the stopper cover engagement portion 22 of the main body 12, which will release the stopper 110 (and the stopper cap 170 connected thereto), the stopper cover 150, and the stopper biasing member 144 from the hollow interior region 36 of the main body. Once these components have been cleaned, the user may then reassemble the lid 10 by first inserting the stopper 110 back into the hollow interior region 36 of the main body 12. Then, the user may position the stopper biasing member 144 over the rod 161 of the stopper cover 150, and threadably connect the engagement portion 162 of the stopper cover with the stopper cover engagement portion 22 of the main body 12, thereby securing the stopper 110 within the hollow interior portion 36 of the main body.

Further, since both the actuating member 130 and the stopper 110 are biased by the button biasing member 32 and the stopper biasing member 144, respectively, the stopper 110 automatically returns to the sealed or closed position (shown in FIG. 11B) once the user removes pressure from the button 30. In this regard, the user may open and drink from the container 8 shown in FIG. 1 to which the lid 10 is attached using one hand by simply pressing the button 30 inward with a finger while consuming a beverage and releasing the button thereafter to automatically reseal the container. As can be appreciated, the ability to open, drink from, and close a container using only one hand may be desirable for various active users including bicyclists, hikers, drivers, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A lid for use with a drinking vessel containing a liquid, comprising:
   a main body selectively couplable to the drinking vessel, the main body including an upper portion having an opening configured to permit fluid passage therethrough when the lid is coupled to the drinking vessel and a main body sidewall extending downward and defining a hollow interior body region, the main body having an upwardly extending central longitudinal body axis;
   a stopper positionable at least partially within the hollow interior body region, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion having a fluid flow barrier portion spanning across the hollow interior body region and a perimeter sidewall along an outer perimeter of the fluid flow barrier portion, the perimeter sidewall being located adjacent to the main body sidewall, the perimeter sidewall being spaced inward of the main body sidewall to form a perimeter fluid flow pathway located between the perimeter sidewall and the main body sidewall, the perimeter fluid flow being maintained when the stopper sealing portion is in the closed position, the stopper having a first engagement portion comprising one of a cam and a cam follower and a second engagement portion comprising one of a cam and a cam follower, the first and second engagement portions of the stopper being laterally spaced apart from each other on opposite sides of the body axis; and
   an actuating member movably coupled to the main body, the actuating member being inwardly movable and having a first engagement portion comprising one of a cam and a cam follower and a second engagement portion comprising one of a cam and a cam follower, the first and second engagement portions of the actuating member being laterally spaced apart from each other on opposite sides of the body axis, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

2. The lid of claim 1, wherein the perimeter sidewall is positioned at least partially within the hollow interior body region and spaced apart from the main body sidewall along at least a portion of the perimeter sidewall during the entire travel of the stopper sealing portion between the opened position and the closed position.

3. The lid of claim 1, wherein the perimeter sidewall is located immediately adjacent to the main body sidewall.

4. The lid of claim 1, wherein the stopper further includes at least one spacer portion positioned to limit lateral movement of the stopper base portion toward the main body sidewall to maintain the perimeter fluid flow pathway outward of the perimeter sidewall and adjacent to the main body sidewall.

5. A lid for use with a drinking vessel containing a liquid, comprising:
   a main body selectively couplable to the drinking vessel, the main body including an upper portion having an opening configured to permit fluid passage therethrough when the lid is coupled to the drinking vessel and a main body sidewall extending downward and defining a hollow interior body region, the main body having an upwardly extending central longitudinal body axis;
   a stopper positionable at least partially within the hollow interior body region, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper having a first engagement portion comprising one of a cam and a cam follower and a second engagement portion comprising one of a cam and a cam follower, the first and second engagement portions of the stopper being laterally spaced apart from each other on opposite sides of the body axis;
   an actuating member movably coupled to the main body, the actuating member being inwardly movable and having a first engagement portion comprising one of a cam and a cam follower and a second engagement portion comprising one of a cam and a cam follower, the first and second engagement portions of the actuating member being laterally spaced apart from each other on opposite sides of the body axis, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position; and wherein the stopper further includes a stopper sealing portion support extending upward from the stopper base portion to above the first and second engagement portions of the stopper with the stopper sealing portion positioned atop the stopper sealing portion support to position the stopper sealing portion in proximity with the opening when the stopper sealing portion is in the opened position and in alignment with the opening when the stopper sealing portion is in the closed position, the stopper sealing portion support being laterally offset from the body axis.

6. The lid of claim 5, wherein the stopper sealing portion support is located immediately adjacent to the main body sidewall.

7. A lid for use with a drinking vessel containing a liquid, comprising:

a main body selectively couplable to the drinking vessel, the main body including an upper portion having an opening configured to permit fluid passage therethrough when the lid is coupled to the drinking vessel and a main body sidewall extending downward and defining a hollow interior body region, the main body having an upwardly extending central longitudinal body axis;

a stopper positionable at least partially within the hollow interior body region, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion has an upwardly extending central passageway extending fully through the stopper base portion along the body axis, the stopper having a first engagement portion comprising one of a cam and a cam follower and a second engagement portion comprising one of a cam and a cam follower, the first and second engagement portions of the stopper being laterally spaced apart from each other on opposite sides of the body axis;

an upwardly extending member extending through the central passageway along the body axis, the upwardly extending member restraining lateral movement of the stopper base portion during movement of the stopper sealing portion between the opened position and the closed position; and an actuating member movably coupled to the main body, the actuating member being inwardly movable and having a first engagement portion comprising one of a cam and a cam follower and a second engagement portion comprising one of a cam and a cam follower, the first and second engagement portions of the actuating member being laterally spaced apart from each other on opposite sides of the body axis, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

8. The lid of claim 7, wherein the first engagement portion of the stopper is positioned on one side of the central passageway and the second engagement portion of the stopper is positioned on an opposite side of the central passageway, and the first engagement portion of the actuating member is positioned on one side of the central passageway and the second engagement portion of the actuating member is positioned on an opposite side of the central passageway.

9. The lid of claim 7, wherein the stopper base portion is slidable along the upwardly extending member during movement of the stopper sealing portion between the opened position and the closed position.

10. The lid of claim 7, wherein the upwardly extending member secures the stopper to the main body during movement of the stopper sealing portion between the opened position and the closed position.

11. The lid of claim 10, wherein the upwardly extending member is releasably attached to the main body.

12. The lid of claim 11, wherein the upwardly extending member is disconnectable from the main body, and when the upwardly extending member is disconnected from the main body, the stopper is fully removable from the hollow interior body region and disconnectable from the main body.

13. A lid for use with a drinking vessel containing a liquid, comprising:

a main body selectively couplable to the drinking vessel, the main body including an upper portion having an opening configured to permit fluid passage therethrough when the lid is coupled to the drinking vessel and a lid cavity extending downward from the upper portion of the main body and having an open lower end;

a stopper including a cam follower, a stopper base portion spanning across the lid cavity, and a sealing member disposed on an upper side of the stopper base portion, the cam follower being positioned above the upper side of the stopper base portion and below the sealing member, the sealing member and the stopper base portion being rigidly connected together and movable together as a unit within the lid cavity between an upper closed position whereat the sealing member sealingly engages the upper portion of the main body at the opening to prevent fluid passage therethrough, and a lower opened position whereat the stopper member is spaced apart from the opening to allow fluid passage through the opening, the stopper base portion having an upwardly extending passageway extending fully through the stopper base portion;

an upwardly extending member extending through the passageway, the upwardly extending member restraining lateral movement of the stopper base portion during movement of the sealing member between the opened position and the closed position; and an actuating member movable relative to the main body in an actuating direction and having a cam surface, the cam follower of the stopper being positioned to be engaged by the cam surface of the actuating member during movement of the actuating member in the actuating direction to cause the cam surface to move the cam follower downward which moves the sealing member to the opened position.

14. The lid of claim 13, wherein the base portion includes a base sidewall portion immediately adjacent to a main body sidewall defining the lid cavity.

15. The lid assembly of claim 14, wherein a spacer portion spaces the base sidewall portion apart from the main body sidewall to limit lateral movement of the base member and maintain a perimeter fluid flow pathway outward of the base sidewall portion and adjacent to the main body sidewall.

16. The lid of claim 13, further including an attachment portion releasably attaching the stopper to the main body.

17. The lid of claim 16, wherein the attachment portion attaches the stopper to the upper portion of the main body.

18. A lid for use with a drinking vessel containing a liquid, comprising:
a main body selectively couplable to the drinking vessel, the main body including an upper portion having an opening configured to permit fluid passage therethrough when the lid is coupled to the drinking vessel and a lid cavity extending downward from the upper portion of the main body and having an open lower end;
a stopper positionable at least partially within the lid cavity, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion having an upwardly extending passageway extending fully through the stopper base portion, the stopper having a first engagement portion comprising one of a cam and a cam follower and a second engagement portion comprising one of a cam and a cam follower, the first and second engagement portions of the stopper being laterally spaced apart from each other;
an upwardly extending member extending through the passageway, the upwardly extending member restraining lateral movement of the stopper base portion during movement of the stopper sealing portion between the opened position and the closed position; and
an actuating member being inwardly movable and having a first engagement portion comprising one of a cam and a cam follower and a second engagement portion comprising one of a cam and a cam follower, the first and second engagement portions of the actuating member being laterally spaced apart from each other, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

19. The lid of claim 18, wherein the stopper base portion has a fluid flow barrier portion spanning across the lid cavity and a perimeter sidewall along an outer perimeter of the fluid flow barrier portion, the perimeter sidewall being located adjacent to a main body sidewall defining the lid cavity, the perimeter sidewall being spaced inward of the main body sidewall to form a perimeter fluid flow pathway located between the perimeter sidewall and the main body sidewall, the perimeter fluid flow being maintained when the stopper sealing portion is in the closed position.

20. The lid of claim 19, wherein the perimeter sidewall is positioned at least partially within the lid cavity and spaced apart from the main body sidewall along at least a portion of the perimeter sidewall during the entire travel of the stopper sealing portion between the opened position and the closed position.

21. The lid of claim 19, wherein the perimeter sidewall is located immediately adjacent to the main body sidewall.

22. The lid of claim 18, wherein the stopper sealing portion is rigidly attached to the stopper base portion for movement of the stopper sealing portion and the stopper base portion together as a unit.

23. The lid of claim 18, wherein the first engagement portion of the stopper is positioned on one side of the passageway and the second engagement portion of the stopper is positioned on an opposite side of the passageway, and the first engagement portion of the actuating member is positioned on one side of the passageway and the second engagement portion of the actuating member is positioned on an opposite side of the passageway.

24. A lid for use with a drinking vessel containing a liquid, comprising:
a main body selectively couplable to the drinking vessel, the main body including an upper portion having an opening configured to permit fluid passage therethrough when the lid is coupled to the drinking vessel and a main body sidewall extending downward and defining a hollow interior body region, the main body having an upwardly extending central longitudinal body axis;
a stopper positionable at least partially within the hollow interior body region, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion has a fluid flow barrier portion spanning across the hollow interior body region and a perimeter sidewall along an outer perimeter of the fluid flow barrier portion, the perimeter sidewall being located adjacent to the main body sidewall, the perimeter sidewall being spaced inward of the main body sidewall to form a perimeter fluid flow pathway located between the perimeter sidewall and the main body sidewall, the perimeter sidewall remaining located adjacent to the main body sidewall and spaced inward of the main body sidewall to form the perimeter fluid flow pathway located between the perimeter sidewall and the main body sidewall when the stopper sealing portion is in the closed position and thereby maintain the perimeter fluid flow when the stopper sealing portion is in the closed position; and an actuating member movably coupled to the main body, the actuating member being inwardly movable to move the stopper downward to the opened position, and being outwardly movable to permit the stopper to move upward from the opened position to the closed position.

25. The lid of claim 24, wherein the stopper has a first engagement portion comprising one of a cam and a cam follower and a second engagement portion comprising one of a cam and a cam follower, the first and second engagement portions of the stopper being laterally spaced apart from each other on opposite sides of the body axis, and the actuating member has a first engagement portion comprising one of a cam and a cam follower and a second engagement portion comprising one of a cam and a cam follower, the first and second engagement portions of the actuating member being laterally spaced apart from each other on opposite sides of the body axis, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

26. The lid of claim 24, wherein the perimeter sidewall is located immediately adjacent to the main body sidewall.

27. The lid of claim 24, wherein the stopper further includes at least one spacer portion positioned to limit lateral movement of the stopper base portion toward the main body sidewall to maintain the perimeter fluid flow pathway outward of the perimeter sidewall and adjacent to the main body sidewall.

28. A lid for use with a drinking vessel containing a liquid, comprising:
a main body selectively couplable to the drinking vessel, the main body including an upper portion having an opening configured to permit fluid passage therethrough when the lid is coupled to the drinking vessel and a main body sidewall extending downward and defining a hollow interior body region, the main body having an upwardly extending central longitudinal body axis;
a stopper positionable at least partially within the hollow interior body region, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion has a fluid flow barrier portion spanning across the hollow interior body region and a perimeter sidewall along an outer perimeter of the fluid flow barrier portion, the perimeter sidewall being located adjacent to the main body sidewall, the perimeter sidewall being spaced inward of the main body sidewall to form a perimeter fluid flow pathway located between the perimeter sidewall and the main body sidewall, the perimeter sidewall being positioned at least partially within the hollow interior body region and spaced apart from the main body sidewall along at least a portion of the perimeter sidewall during the entire travel of the stopper sealing portion between the opened position and the closed position; and
an actuating member movably coupled to the main body, the actuating member being inwardly movable to move the stopper downward to the opened position, and being outwardly movable to permit the stopper to move upward from the opened position to the closed position.

29. A lid for use with a drinking vessel containing a liquid, comprising:
a main body selectively couplable to the drinking vessel, the main body including an upper portion having an opening configured to permit fluid passage therethrough when the lid is coupled to the drinking vessel and a main body sidewall extending downward and defining a hollow interior body region;
a stopper positionable at least partially within the hollow interior body region, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion having an upwardly extending passageway extending fully through the stopper base portion;
an upwardly extending member extending upwardly through the passageway, the upwardly extending member restraining lateral movement of the stopper base portion during movement of the stopper sealing portion between the opened position and the closed position; and
an actuating member movably coupled to the main body, the actuating member being inwardly movable to move the stopper downward to the opened position, and being outwardly movable to permit the stopper to move upward from the opened position to the closed position.

30. The lid of claim 29, wherein the main body has an upwardly extending central longitudinal body axis, and the stopper has a first engagement portion comprising one of a cam and a cam follower and a second engagement portion comprising one of a cam and a cam follower, the first and second engagement portions of the stopper being laterally spaced apart from each other on opposite sides of the body axis, and the actuating member has a first engagement portion comprising one of a cam and a cam follower and a second engagement portion comprising one of a cam and a cam follower, the first and second engagement portions of the actuating member being laterally spaced apart from each other on opposite sides of the body axis, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

31. The lid of claim 29, wherein the stopper has a first engagement portion comprising one of a cam and a cam follower and a second engagement portion comprising one of a cam and a cam follower, the first and second engagement portions of the stopper being laterally spaced apart from each other with the first engagement portion of the stopper being positioned on one side of the central passageway and the second engagement portion of the stopper being positioned on an opposite side of the central passageway, and the actuating member has a first engagement portion comprising one of a cam and a cam follower and a second engagement portion comprising one of a cam and a cam follower, the first and second engagement portions of the actuating member being laterally spaced apart from each other with the first engagement portion of the actuating member being positioned on one side of the central passageway and the second engagement portion of the actuating member being positioned on an opposite side of the central passageway, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

32. The lid of claim 29, wherein the stopper base portion is slidable along the upwardly extending member during movement of the stopper sealing portion between the opened position and the closed position.

33. The lid of claim 29, wherein the upwardly extending member secures the stopper to the main body during movement of the stopper sealing portion between the opened position and the closed position.

34. The lid of claim 29, wherein the main body has an upwardly extending central longitudinal body axis, and the upwardly extending passageway extends fully through the stopper base portion along the body axis.

35. A lid for use with a drinking vessel containing a liquid, comprising:
 a main body selectively couplable to the drinking vessel, the main body including an upper portion having an opening configured to permit fluid passage therethrough when the lid is coupled to the drinking vessel and a lid cavity defined by a main body sidewall extending downward from the upper portion of the main body and having an open lower end;
 a stopper including a cam follower, a stopper base portion, and a sealing member disposed on an upper side of the stopper base portion, the cam follower being positioned above the upper side of the stopper base portion and below the sealing member, the sealing member and the stopper base portion being rigidly connected together and movable together as a unit within the lid cavity between an upper closed position whereat the sealing member sealingly engages the upper portion of the main body at the opening to prevent fluid passage therethrough, and a lower opened position whereat the stopper member is spaced apart from the opening to allow fluid passage through the opening, the stopper base portion having a fluid flow barrier portion spanning across the lid cavity and a perimeter sidewall along an outer perimeter of the fluid flow barrier portion, the perimeter sidewall being located adjacent to the main body sidewall, the perimeter sidewall being spaced inward of the main body sidewall to form a perimeter fluid flow pathway located between the perimeter sidewall and the main body sidewall, the perimeter fluid flow being maintained when the stopper sealing portion is in the closed position; and
 an actuating member movable relative to the main body in an actuating direction and having a cam surface, the cam follower of the stopper being positioned to be engaged by the cam surface of the actuating member during movement of the actuating member in the actuating direction to cause the cam surface to move the cam follower downward which moves the sealing member to the opened position.

36. The lid of claim 35, wherein the stopper base portion has an upwardly extending passageway extending fully through the stopper base portion, and the lid further includes an upwardly extending member extending through the passageway, the upwardly extending member restraining lateral movement of the stopper base portion during movement of the sealing member between the opened position and the closed position.

37. A lid for use with a drinking vessel containing a liquid, comprising:
 a main body selectively couplable to the drinking vessel, the main body including an upper portion having an opening configured to permit fluid passage therethrough when the lid is coupled to the drinking vessel and a lid cavity defined by a main body sidewall extending downward from the upper portion of the main body and having an open lower end;
 a stopper positionable at least partially within the lid cavity, the stopper having a stopper base portion and a stopper sealing portion, the stopper being configured for upward displacement of the stopper sealing portion into a closed position whereat the stopper sealing portion seals the opening to prevent fluid passage therethrough, and downward displacement into an opened position whereat the stopper sealing portion is spaced apart from the opening to allow fluid passage through the opening, the stopper base portion having a fluid flow barrier portion spanning across the lid cavity and a perimeter sidewall along an outer perimeter of the fluid flow barrier portion, the perimeter sidewall being located adjacent to the main body sidewall, the perimeter sidewall being spaced inward of the main body sidewall to form a perimeter fluid flow pathway located between the perimeter sidewall and the main body sidewall, the perimeter fluid flow being maintained when the stopper sealing portion is in the closed position, the stopper having a first engagement portion comprising one of a cam and a cam follower and a second engagement portion comprising one of a cam and a cam follower, the first and second engagement portions of the stopper being laterally spaced apart from each other; and an actuating member being inwardly movable and having a first engagement portion comprising one of a cam and a cam follower and a second engagement portion comprising one of a cam and a cam follower, the first and second engagement portions of the actuating member being laterally spaced apart from each other, the first engagement portion of the actuating member being arranged to engage the first engagement portion of the stopper and apply a downwardly directed operating first force to the first engagement portion of the stopper during inward movement of the actuating member to cause the first engagement portion of the actuating member to move the first engagement portion of the stopper downward and thereby move the stopper sealing portion toward the opened position, and the second engagement portion of the actuating member being arranged to engage the second engagement portion of the stopper and apply a downwardly directed operating second force to the second engagement portion of the stopper during inward movement of the actuating member to cause the second engagement portion of the actuating member to move the second engagement portion of the stopper downward and thereby move the stopper sealing portion toward the opened position.

38. The lid of claim 37, wherein the stopper base portion having an upwardly extending passageway extending fully through the stopper base portion, and the lid further includes an upwardly extending member extending through the passageway, the upwardly extending member restraining lateral movement of the stopper base portion during movement of the stopper sealing portion between the opened position and the closed position.

39. The lid of claim 38, wherein the first engagement portion of the stopper is positioned on one side of the passageway and the second engagement portion of the stopper is positioned on an opposite side of the passageway, and the first engagement portion of the actuating member is positioned on one side of the passageway and the second engagement portion of the actuating member is positioned on an opposite side of the passageway.

* * * * *